(12) United States Patent
Dewan et al.

(10) Patent No.: US 8,751,809 B2
(45) Date of Patent: Jun. 10, 2014

(54) METHOD AND DEVICE FOR SECURELY SHARING IMAGES ACROSS UNTRUSTED CHANNELS

(75) Inventors: Prashant Dewan, Hillsboro, OR (US); David M. Durham, Beaverton, OR (US); Xiaozhu Kang, Fremont, CA (US); Karanvir S. Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/513,047

(22) PCT Filed: Sep. 12, 2011

(86) PCT No.: PCT/US2011/051261
§ 371 (c)(1),
(2), (4) Date: May 31, 2012

(87) PCT Pub. No.: WO2013/039476
PCT Pub. Date: Mar. 21, 2013

(65) Prior Publication Data
US 2013/0067228 A1    Mar. 14, 2013

(51) Int. Cl.
*G06F 12/14* (2006.01)
*H04L 9/32* (2006.01)
*G06F 11/30* (2006.01)

(52) U.S. Cl.
USPC ............ 713/171; 713/186; 340/5.2; 340/5.83

(58) Field of Classification Search
None
See application file for complete search history.

(56) References Cited

U.S. PATENT DOCUMENTS

| 2004/0019801 | A1 | 1/2004 | Lindholm et al. |
| 2006/0236121 | A1* | 10/2006 | Jones et al. .................. 713/186 |
| 2006/0288234 | A1* | 12/2006 | Azar et al. .................... 713/186 |
| 2007/0253604 | A1* | 11/2007 | Inoue et al. ................... 382/118 |
| 2012/0235790 | A1* | 9/2012 | Zhao et al. ................... 340/5.83 |
| 2013/0015946 | A1* | 1/2013 | Lau et al. ....................... 340/5.2 |

FOREIGN PATENT DOCUMENTS

WO        2013039476 A1      3/2013

OTHER PUBLICATIONS

PCT Search Report/Written Opinion prepared for PCT/US2011/051261, mailed Apr. 23, 2012.

* cited by examiner

*Primary Examiner* — Shin-Hon Chen
(74) *Attorney, Agent, or Firm* — Barnes & Thornburg LLP

(57) ABSTRACT

A method and device for securely sharing images across untrusted channels includes downloading an encrypted image from a remote server to a computing device. The encrypted image may be encrypted at the time of uploading by another user. The current user of the computing device is authenticated using a facial recognition procedure. If the current user is authenticated and is determined to be authorized to view the decrypted image, the encrypted image is decrypted and displayed to the user. If the user becomes unauthenticated (e.g., the user leaves the computing device or another user replaces the current user), the encrypted image is displayed in place of the decrypted image such that the decrypted image is displayed only for authorized persons physically present at the computing device.

19 Claims, 6 Drawing Sheets

METHOD AND DEVICE FOR SECURELY SHARING IMAGES ACROSS UNTRUSTED CHANNELS

CROSS REFERENCE TO RELATED APPLICATIONS

This application is a national stage entry under 35 USC §371(b) of International Application No. PCT/US2011/051261, which was filed Sep. 12, 2011.

BACKGROUND

The sharing of pictures and other information is becoming ubiquitous with the increasing use of social networking platforms and dedicated image-sharing websites. While users may share some pictures and information with the general public, other pictures may be deemed confidential and intended to be shared only with a designated person or group of persons. As such, the confidentiality of shared images is an important consideration for many users. Typically, such confidentiality is ensured by the third-party social networking platform or image-sharing website. For example, only members of a pre-designated group may be able to access the user's dedicated page.

Facial recognition is a procedure in which a person can be identified or verified using a digital image of the person and data from a facial database. Facial recognition systems are often used in physical security systems. Some facial recognition systems require an amount of training to allow the facial recognition system to compare selected facial features of the digital image to the data located in the facial database to thereby identify or verify the person.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
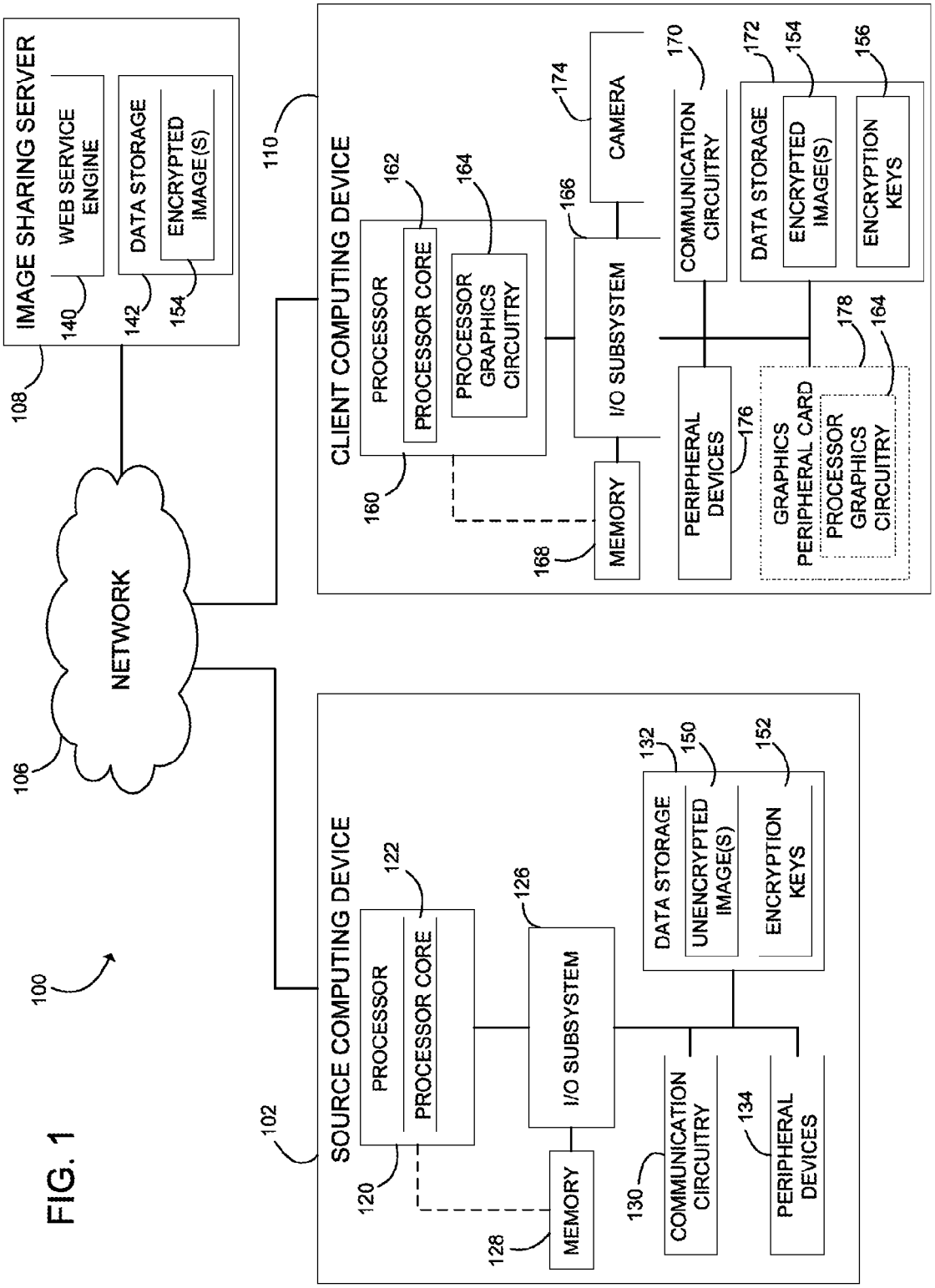
FIG. 1 is a simplified block diagram of at least one embodiment of a system for securely sharing images.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on one or more non-transitory, machine-readable media, which may be read and executed by one or more processors. A non-transitory, machine-readable medium may include any non-transitory mechanism for storing or transmitting information in a form readable by a machine (e.g., a computing device). For example, a non-transitory, machine-readable medium may include any one or combination of read only memory (ROM); random access memory (RAM); magnetic disk storage media; optical storage media; flash memory devices; and others.

Referring now to FIG. 1, a system 100 for securely sharing images across untrusted channels includes a source computing device 102, an image sharing server 108, and a client computing device 110. In use, as discussed in more detail below, the source computing device 102 may securely share a confidential image with one or more designated users of the client computing device 110 via a network 106 and the remote image sharing server 108, both of which may be unsecured in some embodiments. To do so, the confidential image is encrypted by the source computing device 102 prior to uploading to the image sharing server 108. The client computing device 110 may download the encrypted image from the image sharing server 108 via the network 106. As discussed in detail below, the client computing device 110 authenticates a current user of the computing device 110 and verifies whether the authenticated user is authorized to view the image prior to decrypting and displaying the image on the client computing device 110. If the current user is not authenticated or otherwise is not authorized to view the image, the client computing device 110 does not display the decrypted image and may instead display the encrypted image, display a message such as an error message or other message informing that the user is not authorized to view the decrypted image, display nothing, or may take some other action in place of displaying the encrypted image. Additionally, should the client computing device 110 determine that the current user is no longer authenticated (e.g., the current user leaves the computing device 110 or another user attempts to use the computing device 110 in place of the current user), the computing device 110 is configured to display the encrypted image in place of the decrypted image to thereby ensure that the decrypted image is viewed only by the authorized user and only when the authorized user is physically present at the computing device 110.

It should be appreciated that the confidential image shared by the source computing device 102 may be embodied as any type of image or picture. For example, the image may be embodied as a digital picture, a scanned image of document, picture, video or portion thereof, video clip, moving video, or other media, or other image. Additionally, although only one source computing device 102, one network 106, one image sharing server 108, and one client computing device 110 are illustratively shown in FIG. 1, the system 100 may include any number of source computing devices 102, networks 106, image sharing servers 108, and client computing devices 110 in other embodiments. For example, in some embodiments, the user of the source computing device 102 may desire to share the confidential image with several different users of different client computing devices 110.

The source computing device 102 may be embodied as any type of computing device capable of performing the functions described herein. For example, the source computing device 102 may be embodied as a desktop computer, a laptop computer, a mobile internet device, a handheld computer, a smart phone, a personal digital assistant, a telephony device, or other computing device. In the illustrative embodiment of FIG. 1, the source computing device 102 includes a processor 120, an I/O subsystem 126, a memory 128, communication circuitry 130, a data storage device 132, and one or more peripheral devices 134. In some embodiments, several of the foregoing components may be incorporated on a motherboard of the source computing device 102, while other components may be communicatively coupled to the motherboard via, for example, a peripheral port. Furthermore, it should be appreciated that the source computing device 102 may include other components, sub-components, and devices commonly found in a computer and/or computing device, which are not illustrated in FIG. 1 for clarity of the description.

The processor 120 of the source computing device 102 may be embodied as any type of processor capable of executing software/firmware, such as a microprocessor, digital signal processor, microcontroller, or the like. The processor 120 is illustratively embodied as a single core processor having a processor core 122. However, in other embodiments, the processor 120 may be embodied as a multi-core processor having multiple processor cores 122. Additionally, the source computing device 102 may include additional processors 120 having one or more processor cores 122.

The I/O subsystem 126 of the source computing device 102 may be embodied as circuitry and/or components to facilitate input/output operations with the processor 120 and/or other components of the source computing device 102. In some embodiments, the I/O subsystem 126 may be embodied as a memory controller hub (MCH or "northbridge"), an input/output controller hub (ICH or "southbridge"), and a firmware device. In such embodiments, the firmware device of the I/O subsystem 126 may be embodied as a memory device for storing Basic Input/Output System (BIOS) data and/or instructions and/or other information (e.g., a BIOS driver used during booting of the source computing device 102). However, in other embodiments, I/O subsystems having other configurations may be used. For example, in some embodiments, the I/O subsystem 126 may be embodied as a platform controller hub (PCH). In such embodiments, the memory controller hub (MCH) may be incorporated in or otherwise associated with the processor 120, and the processor 120 may communicate directly with the memory 128 (as shown by the hashed line in FIG. 1). Additionally, in other embodiments, the I/O subsystem 126 may form a portion of a system-on-a-chip (SoC) and be incorporated, along with the processor 120 and other components of the source computing device 102, on a single integrated circuit chip.

The processor 120 is communicatively coupled to the I/O subsystem 126 via a number of signal paths. These signal paths (and other signal paths illustrated in FIG. 1) may be embodied as any type of signal paths capable of facilitating communication between the components of the source computing device 102. For example, the signal paths may be embodied as any number of wires, cables, light guides, printed circuit board traces, via, bus, intervening devices, and/or the like.

The memory 128 of the source computing device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 128 is communicatively coupled to the I/O subsystem 126 via a number of signal paths. Although only a single memory device 128 is illustrated in FIG. 1, the source computing device 102 may include additional memory devices in other embodiments. Various data and software may be stored in the memory device 128. For example, one or more operating systems, applications, programs, libraries, and drivers that make up the software stack executed by the processor 120 may reside in memory 128 during execution. Furthermore, software and data stored in memory 128 may be swapped between the memory 128 and the data storage 132 as part of memory management operations.

The communication circuitry 130 of the source computing device 102 may be embodied as any number of devices and circuitry for enabling communications between the source computing device 102 and remote computing devices (e.g., the image sharing server 108 or directly with the client computing device 110) over the network 106. The network 106 may be embodied as any number of various wired and/or wireless communication networks. For example, the network 106 may be embodied as or otherwise include a local area network (LAN), a wide area network (WAN), or a publicly-accessible, global network such as the Internet. Additionally, the network 106 may include any number of additional devices to facilitate communication between the source computing device 102, the image sharing server 108, and the client computing device 110. The source computing device 102, the image sharing server 108, and the client computing device 110 may use any suitable communication protocol to communicate with each other over the network 106 depending on, for example, the particular type of network(s) 106.

The data storage device(s) 132 may be embodied as any type of device or devices configured for the short-term or long-term storage of data such as, for example, memory devices and circuits, memory cards, hard disk drives, solid-state drives, or other data storage devices. The confidential, unencrypted image(s) 150 to be shared with the authorized user of the client computing device 110 may be stored in the data storage device 132. Additionally, as discussed in more detail below, one or more encryption keys 152 may be stored in a secure location of the data storage device 132 for use in encrypting the image 150.

The peripheral devices 134 of the source computing device 102 may include any number of peripheral or interface devices. For example, the peripheral devices 134 may include a display, a keyboard, a mouse, external speakers, and/or other peripheral devices. The particular devices included in the peripheral devices 134 may depend upon, for example, the intended use of the source computing device 102. The peripheral devices 134 are communicatively coupled to the I/O subsystem 126 via a number of signal paths thereby allowing the I/O subsystem 126 and/or processor 120 to receive inputs from and send outputs to the peripheral devices 134.

The image sharing server 108 may be embodied as any number and type of servers or computing devices capable of communicating with the source computing device 102 and the client computing device 110 and performing the functions described herein. In some embodiments, the image sharing server 108 may be embodied as a server for a social networking website, image sharing website, or other website accessible by the computing devices 102, 110 to share images and other information. The illustrative image sharing server 108 includes a web service engine 140 to provide a web portal to the computing devices 102, 110 for various web services such as image uploading/downloading services, webpage access, and the like. Additionally, after the source computing device 102 has uploaded the encrypted image 154, the encrypted image 154 may be stored in a data storage 142 of the image sharing server 108.

The client computing device 110 may be similar to the source computing device 102. As such, the client computing device 110 may be embodied as any type of computing device capable of performing the functions described herein. For example, the computing device 110 may be embodied as a desktop computer, a laptop computer, a mobile internet device, a handheld computer, a smart phone, a personal digital assistant, a telephony device, or other computing device. In the illustrative embodiment of FIG. 1, the computing device 110 includes a processor 160, an I/O subsystem 166, a memory 168, communication circuitry 170, a data storage device 172, a camera 174, and one or more peripheral devices 176. In some embodiments, several of the foregoing components may be incorporated on a motherboard of the computing device 110, while other components may be communicatively coupled to the motherboard via, for example, a peripheral port. Furthermore, it should be appreciated that the client computing device 110 may include other components, sub-components, and devices commonly found in a computer and/or computing device, which are not illustrated in FIG. 1 for clarity of the description.

The processor 160 of the client computing device 110 may be embodied as any type of processor capable of executing software/firmware, such as a microprocessor, digital signal processor, microcontroller, or the like. The processor 160 is illustratively embodied as a single core processor having a processor core 162. However, in other embodiments, the processor 160 may be embodied as a multi-core processor having multiple processor cores 162. Additionally, the client computing device 110 may include additional processors 160 having one or more processor cores 162. In the illustrative embodiment, the processor 160 includes a processor graphics circuitry 164 defined on a common die with the processor core 162. The processor graphics circuitry 164 is configured to perform various graphics processing functions such as accelerating the generation of graphics and the like. As such, the processor graphics circuitry 164 is typically used to support the generation of graphics on the computing device 110. Although the illustrative processor graphics circuitry 164 is shown in FIG. 1 as being embodied in the processor 160, in other embodiments, the processor graphics circuitry 164 may be included in a graphics peripheral card 178 of the computing device 110. For example, the processor graphics circuitry 164 may be embodied as a graphics processing unit of the graphics peripheral card 178, which may be communicatively coupled to the I/O subsystem 166 via a peripheral bus such as a peripheral component interconnect express (PCIe) bus.

Similar to the source computing device 102, the I/O subsystem 166 of the client computing device 110 may be embodied as circuitry and/or components to facilitate input/output operations with the processor 160 and/or other components of the client computing device 110. In some embodiments, the I/O subsystem 166 may be embodied as a memory controller hub (MCH or "northbridge"), an input/output controller hub (ICH or "southbridge"), and a firmware device. In such embodiments, the firmware device of the I/O subsystem 166 may be embodied as a memory device for storing Basic Input/Output System (BIOS) data and/or instructions and/or other information (e.g., a BIOS driver used during booting of the source computing device 102). However, in other embodiments, I/O subsystems having other configurations may be used. For example, in some embodiments, the I/O subsystem 166 may be embodied as a platform controller hub (PCH). In such embodiments, the memory controller hub (MCH) may be incorporated in or otherwise associated with the processor 160, and the processor 160 may communicate directly with the memory 168 (as shown by the hashed line in FIG. 1). Additionally, in other embodiments, the I/O subsystem 166 may form a portion of a system-on-a-chip (SoC) and be incorporated, along with the processor 160 and other components of the client computing device 110, on a single integrated circuit chip.

The processor 160 is communicatively coupled to the I/O subsystem 166 via a number of signal paths. Similar to the signal paths of the source computing device 102, the signal paths of the client computing device 110 may be embodied as any type of signal paths capable of facilitating communication between the components of the computing device 110. For example, the signal paths may be embodied as any number of wires, cables, light guides, printed circuit board traces, via, bus, intervening devices, and/or the like.

The memory 168 of the client computing device 110 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 168 is communicatively coupled to the I/O subsystem 166 via a number of signal paths. Although only a single memory device 168 is illustrated in FIG. 1, the client computing device 110 may include additional memory devices in other embodiments. Various data and software may be stored in the memory device 168. For example, one or more operating systems, applications, programs, libraries, and drivers that make up the software stack executed by the processor 160 may reside in memory 168 during execution. Furthermore, software and data stored in memory 168 may be swapped between the memory 168 and the data storage 172 as part of memory management operations.

The communication circuitry 170 of the client computing device 110 may be embodied as any number of devices and circuitry for enabling communications between the computing device 110 and remote computing devices (e.g., the image sharing server 108 or directly with the source computing device 102) over the network 106. The data storage device(s) 172 may be embodied as any type of device or devices configured for the short-term or long-term storage of data such as, for example, memory devices and circuits, memory cards, hard disk drives, solid-state drives, or other data storage devices. As discussed in more detail below, when the client computing device 110 downloads the encrypted image 154 from the image sharing server, the encrypted image 154 may be stored in the data storage device 172. Additionally, one or more private encryption keys 156 may be stored in a secure location of the data storage device 172 for use in decrypting an encrypted symmetric key received with the encrypted image 154 as discussed in more detail below.

The camera 174 may be embodied as any type of camera, such as a still camera, a video camera, or the like, that is capable of generating real-time images of a user of the computing device 110. In some embodiments, the camera 174 may be incorporated into a housing of the client computing device 110. For example, the camera 174 may be incorporated near the display screen of the computing device 110 such that the user of the computing device 110 may be monitored while operating the computing device 110. In other embodiments, the camera 174 may be a peripheral device communicatively coupled to the computing device 110 and positioned so as to monitor the user of the computing device 110.

The peripheral devices 176 of the client computing device 110 may include any number of peripheral or interface devices. For example, the peripheral devices 176 may include a display, a keyboard, a mouse, external speakers, and/or other peripheral devices. The particular devices included in the peripheral devices 176 may depend upon, for example, the intended use of the computing device 110. The peripheral devices 176 are communicatively coupled to the I/O subsystem 166 via a number of signal paths thereby allowing the I/O subsystem 166 and/or processor 160 to receive inputs from and send outputs to the peripheral devices 176.

Figure 2:
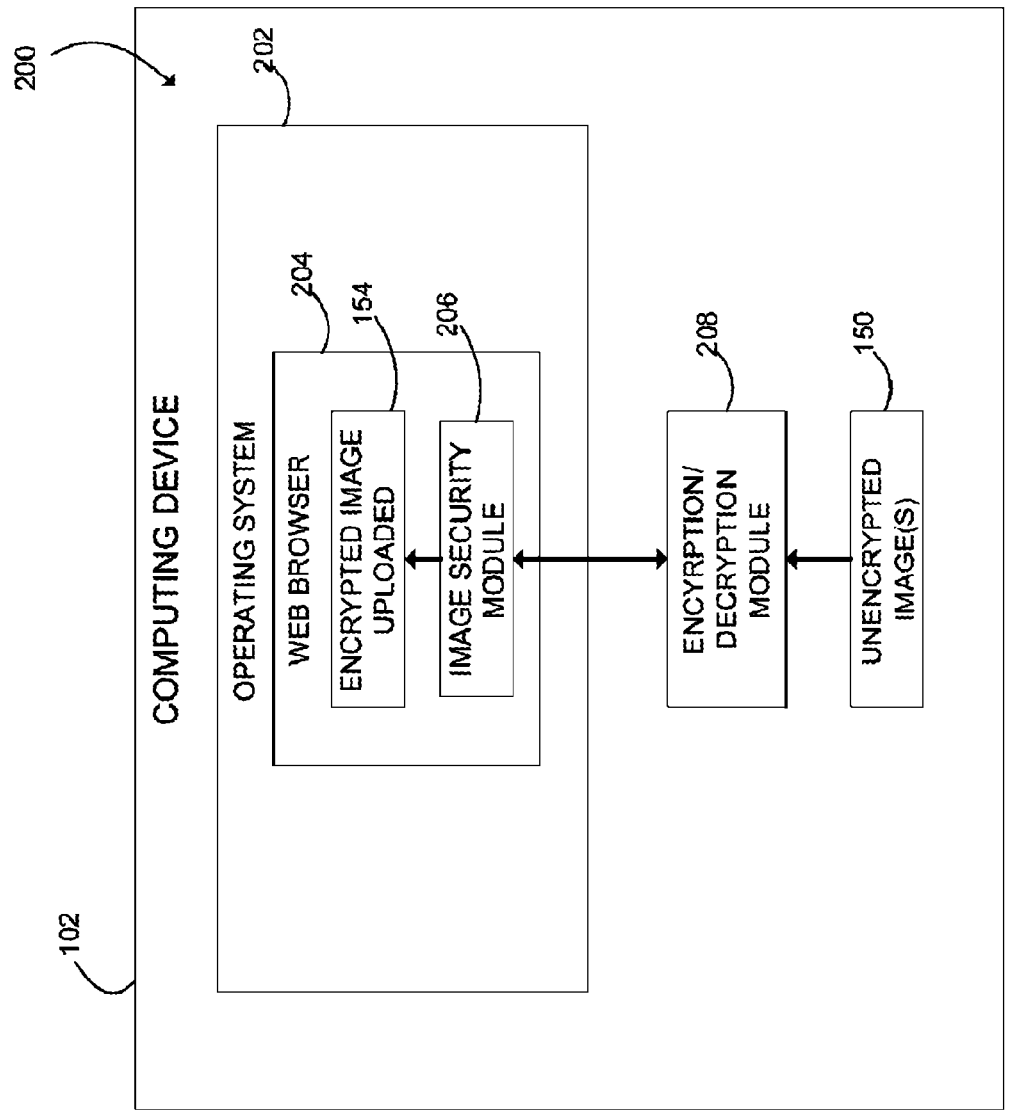
FIG. 2 is a simplified block diagram of at least one embodiment of a software environment of a source computing device of the system of FIG. 1.

In use, as shown in FIG. 2, the source computing device 102 may establish a software environment 200 for securely sharing the confidential image 150. The software environment 200 includes an operating system 202 executed by the processor 120. A web browser 204 may be executed by the operating system 202 to allow the source computing device 102 to communicate with the image sharing server 108 to upload the image 150 thereto. The web browser 204 includes an image security module 206, which may be embodied as a browser plug-in, a stand-alone application, or other software/firmware module. The image security module 206 is configured to communicate with an encryption/decryption module 208 to encrypt the confidential image 150 prior to uploading the image 150 to the image sharing server 108. In some embodiments, the encryption/decryption module 208 may be embodied as a security co-processor of the source computing device 102, a cryptographic accelerator incorporated into the processor 120, or a stand-alone cryptographic software/firmware.

As discussed in more detail below, the user may operate the source computing device 102 to share securely the confidential image 150 with one or more designated persons. To do so, the image security module 206 is configured to communicate with the encryption/decryption module 208 to encrypt the confidential image 150 prior to uploading the image 150 to the image sharing server 108 as the encrypted image 154. In the illustrative embodiment, as discussed in more detail below, the confidential image 150 is encrypted using a symmetric cryptographic key, which may be generated by the encryption/decryption module 208. The symmetric cryptographic key is subsequently encrypted using a public key belonging to the designated authorized person (e.g., the user of the client computing device 110). The encrypted symmetric key is then packaged with the encrypted image 154 and uploaded to the image sharing server 108. In this way, only the encrypted image 154 is accessible by the public.

Figure 3:
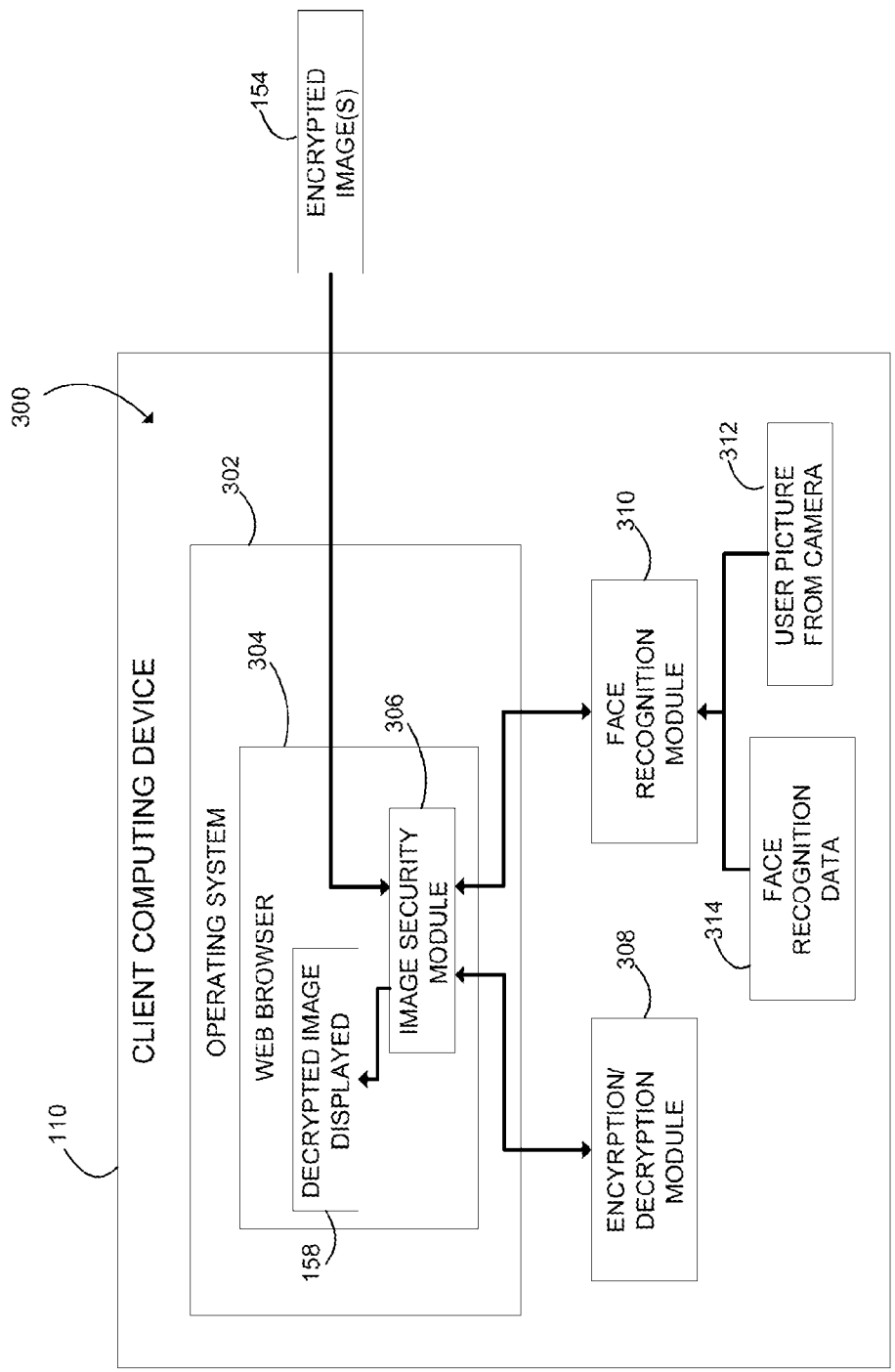
FIG. 3 is a simplified block diagram of at least one embodiment of a software environment of a client computing device of the system of FIG. 1.

Referring now to FIG. 3, similar to the source computing device 102, the client computing device 110 may establish a software environment 300 for securely accessing and displaying the confidential image 150. The software environment 300 includes an operating system 302 executed by the processor 160. A web browser 304 may be executed by the operating system 302 to allow the client computing device 110 to communicate with the image sharing server 108, for example, to download the encrypted image 154, various web pages, and/or other data. The web browser 304 includes an image security module 306, which may be embodied as a browser plug-in, a stand-alone application, or other software/firmware module. The image security module 306 is configured to communicate with an encryption/decryption module 308 to perform various encryption/decryption functions, including decrypting the encrypted image 154, as discussed in more detail below. Similar to the source computing device 102, the encryption/decryption module 308 of the client computing device 110 may be embodied as a security co-processor, a cryptographic accelerator incorporated into the processor 160, or a stand-alone cryptographic software/firmware.

The software environment 300 also includes a face recognition module 310 executed by the processor graphics circuitry 164 to identify a current user of the computing device 110 from the real-time image(s) 312 received from the camera 174 using pre-trained or predefined face recognition data 314, which may be stored in a protected location of the data storage device 172. To do so, the face recognition module 310 may utilize any face detection and recognition algorithm capable of analyzing the image or images 312 generated by the camera 174 to authenticate the current user. If the current user is authenticated (i.e., identified as a predefined user) and determined to be authorized to view the confidential image 150, the image security module 306 communicates with the encryption/decryption module 308 to decrypt the encrypted image 154 and display the decrypted image 158 to the authenticated, authorized current user on the computing device 110 as discussed in more detail below in regard to FIGS. 5 and 6.

Figure 4:
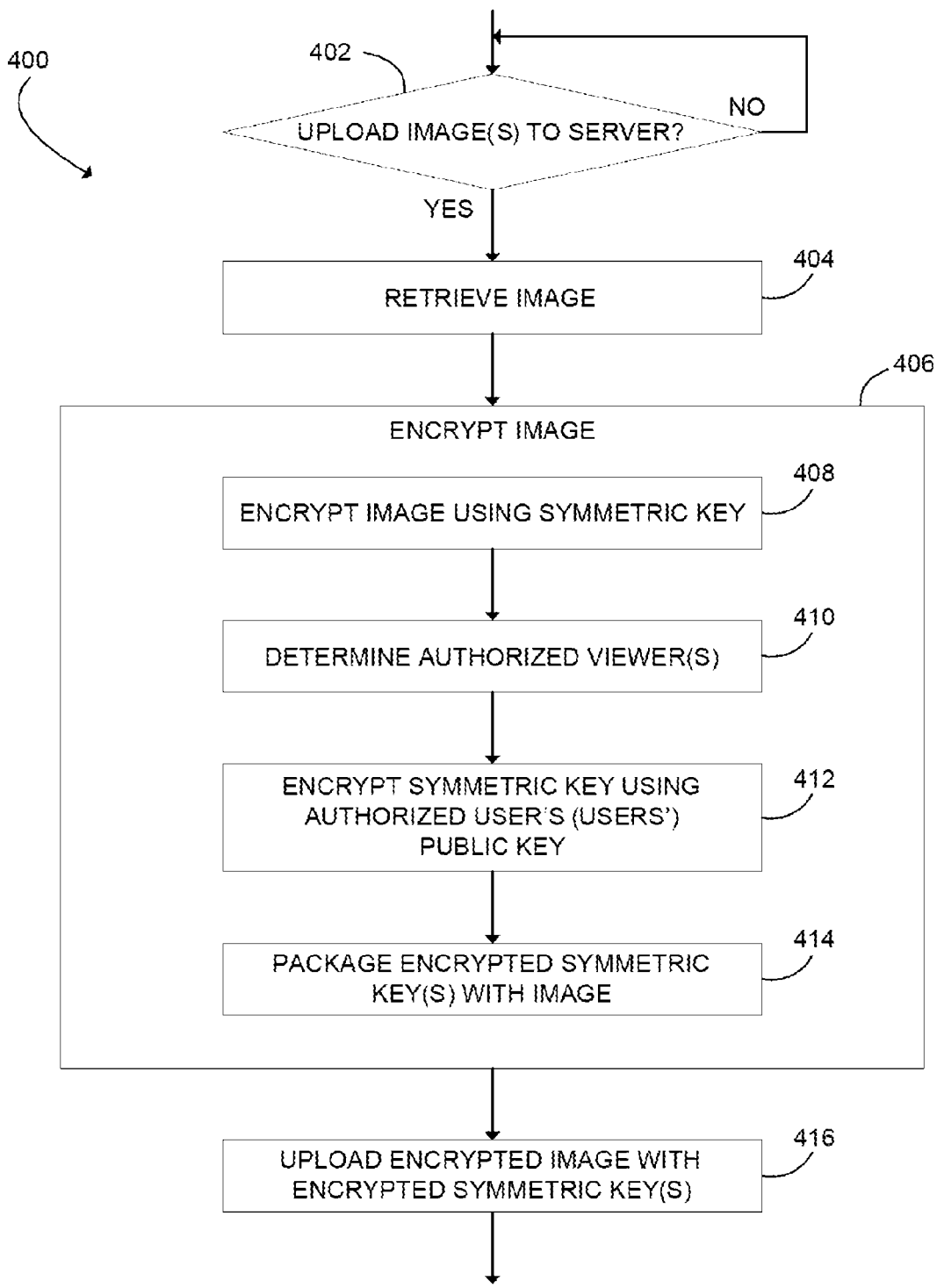
FIG. 4 is a simplified flow diagram of at least one embodiment of a method for securely sharing a confidential image.

Referring now to FIG. 4, one illustrative embodiment of a method 400 for securely sharing a confidential image, which may be executed by the source computing device 102, begins with block 402. In block 402, the source computing device 102 determines whether the user of the source computing device 102 desires to upload the confidential image(s) 150 to the image sharing server 108. As discussed above, the user of the source computing device 102 may use the web browser 204 to navigate to a web page hosted by the web service engine 140 of the image sharing server 108 to facilitate the uploading of the confidential image 150. If the source computing device 102 determines, in block 402, that the confidential image 150 is to be uploaded, the method 400 advances to block 404 in which the confidential image 150 is retrieved from the data storage 132.

In block 406, the confidential image 150 is encrypted. In the illustrative embodiment, the source computing device 102 utilizes the encryption/decryption module 208 to encrypt the confidential image 150. To do so, the encryption/decryption module 208 encrypts the confidential image 150 using a symmetric cryptographic key, which may be generated by the encryption/decryption module 208. In block 410, the source computing device 102 determines the user or users authorized to view the confidential image 150. To do so, the user of the source computing device 102 may select one or more end-users that are authorized to view the confidential image 150. For each authorized user, the symmetric key used to encrypt the confidential image 150 is itself encrypted using a public key of the authorized user. It should be appreciated that such public key is one half of a public-private cryptographic key pair as is well known in the art. In some embodiments, the public key is generated by the authorized user and subsequently shared. The public-private cryptographic key pair may be generated using any suitable cryptographic procedure. In one particular embodiment, the public key is generated based on or otherwise using an image of the owner of the public-private cryptographic key pair (i.e., the authorized user). For example, the image of the authorized user may be used as a seed value for generating the public-private cryptographic key pair, and the public key may then be subsequently shared with the user of the source computing device 102. Alternatively, the public key may be generated by the source computing device 102 based on the image of the authorized user. In such embodiments, the public key itself need not be shared with the source computing device 102. Rather, the image of the authorized user may be shared, and the source computing device 102 may derive the public key using that image.

The symmetric key may be separately encrypted using a different public key for each authorized user. Alternatively, a group of users may a share a single private key of the public-private cryptographic key pair such that the symmetric key need be encrypted only once using the single public key to thereby authorize the complete group of users to view the confidential image 150.

After the symmetric key has been encrypted using the public key of the authorized user(s), the encrypted symmetric key is packaged with the encrypted image 154 in block 414. To do so, the encrypted symmetric key may be packaged as header or metadata of the encrypted image, encrypted directly with the encrypted image, or otherwise incorporated or associated with the encrypted image. Additionally, in some embodiments, the source computing device 102 may have access to a pre-generated image of the authorized user's face (e.g., in those embodiments wherein the source computing device 102 is configured to derive the public key from the image of the authorized user). In such embodiments, the image of the authorized user may also be packaged with the encrypted image 154 in an encrypted or unencrypted state. As discussed below in more detail, the client computing device 110 may subsequently use the packed image of the authorized user to authenticate the current user of the computing device 110.

In block 416, the encrypted image 154, including the encrypted key, is uploaded to the image sharing server 108. The encrypted image 154 may thereafter be accessed by authorized and/or unauthorized users. However, as discussed in more detail below, unauthorized users are capable of viewing only the encrypted image 154, which is indiscernible to the unauthorized users due to the encryption.

Figure 5:
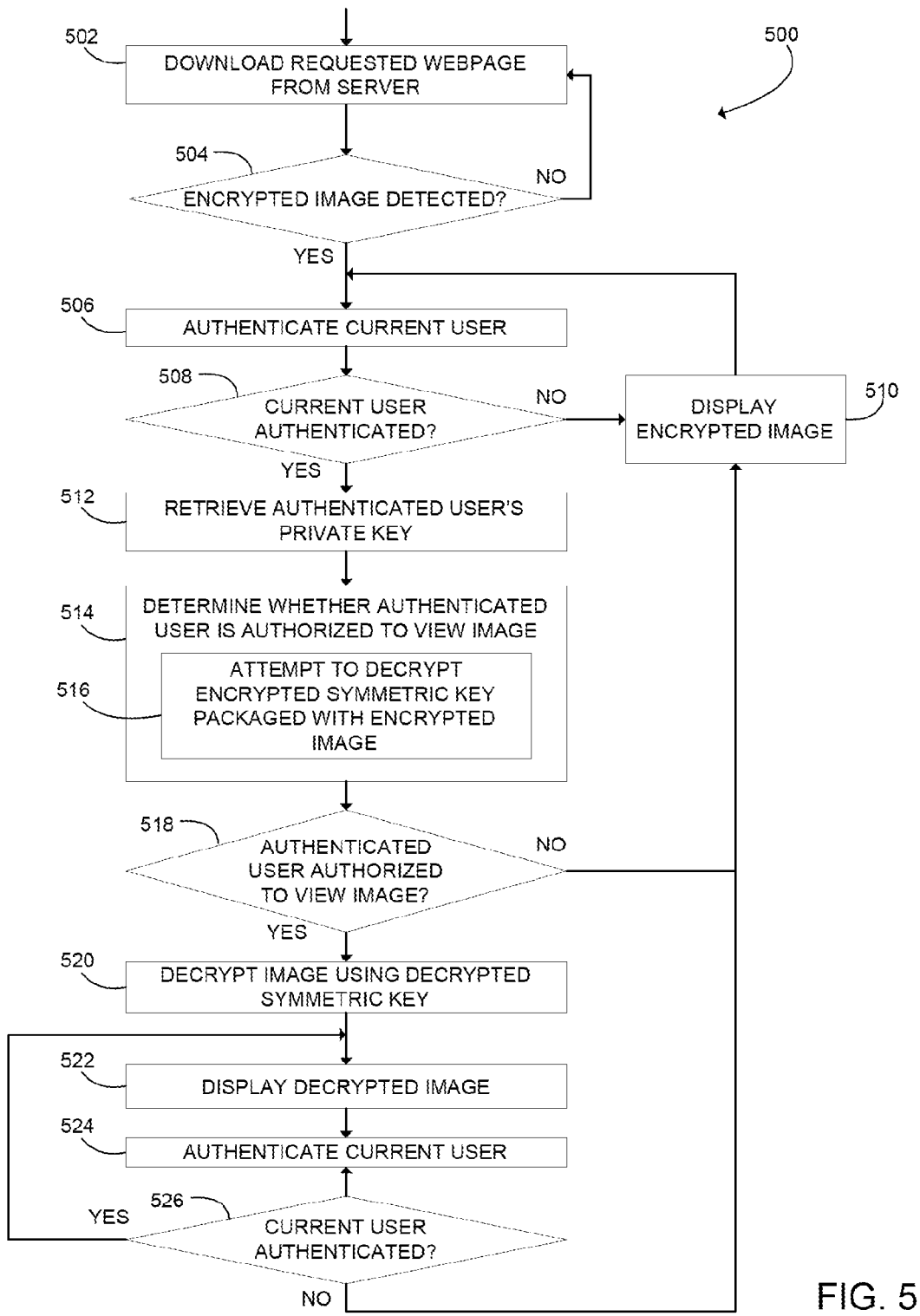
FIG. 5 is a simplified flow diagram of at least one embodiment of a method for securely displaying a confidential image to an authorized user.

Referring now to FIG. 5, one illustrative embodiment of a method 500 for securely accessing and displaying a confidential image, which may be executed by the client computing device 110, begins with block 502. In block 502, the client computing device 110 downloads a requested webpage from the image sharing server 108. The webpage may be embodied as a standard webpage, which may include the encrypted image 154, or may be embodied simply as the encrypted image 154 itself. As such, in block 504, the client computing device 110 determines whether the webpage includes an encrypted image. The client computing device 110 may determine that the webpage includes an encrypted image using any suitable methodology such as analyzing the image itself, analyzing metadata associated with the image, being informed that the image is encrypted by the image sharing sever 108, or the like.

Figure 6:
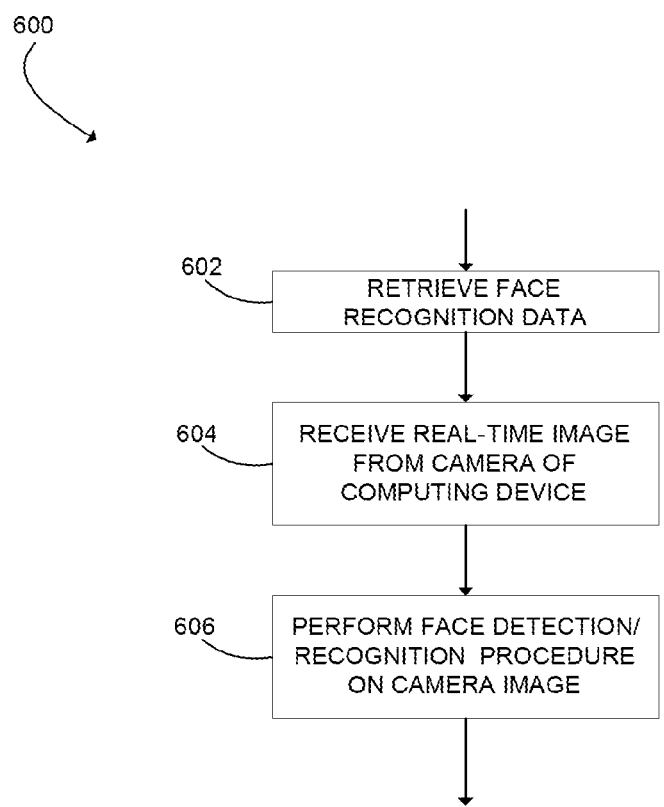
FIG. 6 is a simplified flow diagram of at least one embodiment of a method for authenticating a current user of the client computing device of FIG. 1.

If the client computing device 110 determines that the downloaded webpage includes an encrypted image in block 502, the method 500 advances to block 506 in which the current user of the client computing device 110 is authenticated. To do so, the client computing device 110 may execute a method 600 to authenticate the current user using a face recognition/detection procedure as shown in FIG. 6. The method 600 may be executed by, for example, the face recognition module 310. The method 600 begins with block 602 in which face recognition data 314 is retrieved. As discussed above in regard to FIG. 3, the face recognition data 314 may be embodied as any type of data usable by the computing device 110 (e.g., the processor graphics circuitry 164) to identify a current user of the computing device 110 such as pre-generated pictures of a current user's face, facial feature data, or other data that may be used for comparison with a real-time image of the current user. In some embodiments, the face recognition data 314 is previously generated during a training period of the face recognition module 310. Additionally or alternatively, in embodiments wherein the packaged encrypted image 154 includes an image of the authorized user, the face recognition data 314 may be embodied as the received image of the authorized user or as face recognition data based on the received image of the authorized user.

In block 604, the face recognition module 310 of the client computing device 110 receives a real-time image(s) 312 of the current user of the computing device 110 from the camera 174. As discussed above, the camera 174 may be incorporated into the computing device 110 or otherwise positioned such that the camera 174 can generate an image 312 of the current user of the computing device 110. In block 606, the face recognition module 310 performs a face detection/recognition procedure on the real-time image 312 using the face recognition data 314 retrieved in block 602 to thereby identify the current user as a known user or an unknown user. The face recognition module 310 may use any suitable face detection and recognition procedure to authenticate the current user.

It should be appreciated that the method 600, and in particular the face detection and recognition procedure of block 606, may be a processor-intensive procedure. As such, in the illustrative embodiment, the method 600 is offloaded to the processor graphics circuitry 164 as discussed above in regard to the face recognition module 310. By allowing the processor graphics circuitry 164 to execute the method 600 to authenticate the current user, the processor 160 (i.e., processor cores 162) may execute other portions of the method 500 with an increased efficiency and speed. As such, it should be appreciated that although the authentication process of block 506 is shown as being executed serially in method 500, the method 600 performed in the block 506 may be executed by the processor graphics circuitry 164 in parallel with the remainder of the method 500 or portions thereof.

Referring back to FIG. 5, the computing device 110 determines whether the current user has been authenticated in block 508. If the current user could not be authenticated (e.g., the current user could not be identified, there is no current user of the computing device 110, etc.), the method 500 advances to block 510 in which the encrypted image 154 is displayed on the computing device 110. However, if the current user was successfully authenticated, the method 500 advances to block 512 in which a private key associated with the authenticated user is retrieved. As discussed above, the private key is one-half of a public-private cryptographic key pair. While the public key was previously shared with the source computing device 102 and is generally publically available, the private key is kept secret. As such, the private key may be stored in a secured location of the data storage 172 or the like.

After the authenticated user's private key has been retrieved in block 512, the computing device 110 determines whether the authenticated user is authorized to view the decrypted image 158 of the encrypted image 154. To do so, the computing device 110 attempts to decrypt the encrypted symmetric key packaged with the encrypted image in block 516. Such decryption process, and other encryption/decryption processes, may be performed by the encryption/decryption module 308 as discussed above. If the computing device 110 is unable to decrypt the encrypted symmetric key using the private key of the authenticated user, the computing device 110 determines that the user, while authenticated, is not authorized to view the decrypted image 158 in block 518. As such, the method 500 advances to block 510 in which the encrypted image 154 is displayed on the computing device 110.

However, if the computing device 110 is able to decrypt the symmetric key using the private key of the authenticated user, the computing device 110 determines that the authenticated user is authorized to view the decrypted image 158 of the encrypted image 154 and advances to block 520. In block 520, the encrypted image 154 is decrypted using the decrypted symmetric key, which was decrypted using the authenticated user's private key as discussed above. Again, the decryption process of the encrypted image may be executed by the encryption/decryption module 308 of the client computing device 110. In block 522, the decrypted image 158 is displayed to the authenticated user on the computing device 110.

It should be appreciated that while the decrypted image 158 is being displayed on the computing device 110, the authenticated, authorized current user may leave the computing device 110, be replaced by another user, or otherwise stop operating the computing device 110. As such, the current user is continuously or periodically authenticated in blocks 524, 526 while the decrypted image 158 is displayed on the computing device 110. To do so, the computing device 110 may execute the method 600 to authenticate the current user in block 524. As discussed above, the method 600 may be executed by the processor graphics circuitry 164 in parallel and contemporaneously with portions of the method 500. Should the current user no longer be authenticated (e.g., the current user leaves the computing device 110), the method 500 advances to block 510 in which the decrypted image 158 is replaced with the encrypted image 154. In this way, the authorized current user is continuously or periodically authenticated at the computing device 110 while the decrypted image 158 is displayed on the computing device 110. As such, the confidentially of the image 150 is secured not only during transit through the untrusted channel (e.g., the network 106 and the image sharing server 108), but also at the computing device 110 by ensuring only the authorized user is allowed to view the image on the computing device 110.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
   downloading an encrypted image and an image of an authorized user to a computing device, the encrypted image including additional information useable to identify the authorized user;
   receiving an image of a current user of the computing device from a camera communicatively coupled to the computing device;
   authenticating the current user by performing a facial recognition procedure on the image of the current user using the image of the authorized user to verify that the current user is the authorized user;
   determining whether the authenticated current user is authorized to view a decrypted image of the encrypted image based on the additional information included with the encrypted image;
   in response to the authenticated current user being authorized to view the decrypted image, (i) decrypting the encrypted image and (ii) displaying the decrypted image on the computing device;
   in response to the authenticated current user not being authorized to view the decrypted image, displaying the encrypted image on the computing device; and
   continually authenticating the user while the decrypted image is displayed on the computing device.

2. The method of claim 1, wherein downloading an encrypted image comprises downloading a webpage including the encrypted image from the remote server using a web browser of the computing device.

3. The method of claim 1, wherein downloading an encrypted image comprises downloading an encrypted image including an encrypted key, and
   wherein determining whether the authenticated current user is authorized to view the decrypted image comprises determining whether a private key associated with the authenticated current user can decrypt the encrypted key.

4. The method of claim 3, wherein decrypting the encrypted image comprises (i) decrypting the encrypted key and (ii) decrypting the encrypted image using the decrypted key.

5. The method of claim 3, wherein the encrypted key is encrypted using a public key generated as a function of an image of the authenticated current user.

6. The method of claim 1, wherein receiving an image of the current user comprises receiving an image generated by the camera in real-time.

7. The method of claim 1, wherein authenticating the current user comprises performing a facial recognition procedure on the image of the current user using a processor graphics circuitry of the computing device.

8. The method of claim 1, wherein determining whether the authenticated current user is authorized to view a decrypted image comprises retrieving a private key of the current user and determining whether the private key can decrypt an encrypted symmetric key that is usable to decrypt the encrypted image.

9. The method of claim 1, wherein decrypting the encrypted image comprises decrypting the encrypted image using a symmetric key that was previously decrypted using a private key of the current user.

10. The method of claim 1, wherein displaying the decrypted image comprises displaying the decrypted image only while the current user is authenticated using the facial recognition procedure.

11. The method of claim 1, further comprising displaying the encrypted image in place of the decrypted image in response to the current user no longer being authenticated.

12. A computing device comprising:
a processor graphics circuitry;
a processor; and
a memory having stored therein a plurality of instructions that, in response to being executed by the processor, causes the processor to:
download a webpage including an encrypted image and an image of an authorized user that is authorized to view the decrypted image, the encrypted image including additional information useable to identify the authorized user;
authenticate a current user of the computing device by performing a facial recognition procedure on a real-time image of the current user;
determine whether the authenticated current user is authorized to view a decrypted image of the encrypted image based on the additional information included with the encrypted image;
in response to the authenticated current user being authorized to view the decrypted image, (i) decrypt the encrypted image and (ii) display the decrypted image on the computing device;
in response to the authenticated current user not being authorized to view the decrypted image, display the encrypted image on the computing device; and
continually authenticate the user while the decrypted image is displayed on the computing device;
wherein the processor graphics circuitry is to perform the facial recognition procedure on the real-time image of the current user to verify that the current user is the authorized user.

13. The computing device of claim 12, wherein the processor graphics circuitry is located on a common die with the central processing unit.

14. The computing device of 12, wherein the processor graphics circuitry is located on a peripheral graphics card of the computing device.

15. The computing device of claim 12, wherein:
the encrypted image comprises an encrypted symmetric key, and
to determine whether the current user is authorized to view the decrypted image comprises to determine whether a private key of the current user can decrypt the encrypted symmetric key.

16. The computing device of claim 15, wherein to decrypt the encrypted image comprises to decrypt the encrypted image using the decrypted symmetric key.

17. The computing device of claim 15, wherein the encrypted symmetric key is encrypted using a public key generated as a function of a previously-generated image of the current user.

18. The computing device of claim 12, wherein to display the decrypted image comprises to display the decrypted image only while the current user is authenticated by the computing device.

19. One or more non-transitory, computer readable media comprising a plurality of instructions that, in response to being execute, cause a computing device to:
download an encrypted image and an image of an authorized user, the encrypted image including additional information useable to identify the authorized user;
receive an image of a current user of the computing device from a camera communicatively coupled to the computing device;
authenticate the current user by performing a facial recognition procedure on the image of the current user using the image of the authorized user to verify that the current user is the authorized user;
determine whether the authenticated current user is authorized to view a decrypted image of the encrypted image based on the additional information included with the encrypted image;
in response to the authenticated current user being authorized to view the decrypted image, (i) decrypting the encrypted image and (ii) displaying the decrypted image on the computing device;
in response to the authenticated current user not being authorized to view the decrypted image, displaying the encrypted image on the computing device; and
continually authenticate the user while the decrypted image is displayed on the computing device.

* * * * *